US005744249A

United States Patent [19]
Kopytko

[11] Patent Number: 5,744,249
[45] Date of Patent: Apr. 28, 1998

[54] WEATHER-RESISTANT, PLASTICIZER-FREE, DEEP-DRAWABLE FILM

[75] Inventor: Walter Kopytko, Waldkraiburg, Germany

[73] Assignee: Benecke-Kaliko AG, Germany

[21] Appl. No.: 588,860

[22] Filed: Jan. 19, 1996

Related U.S. Application Data

[62] Division of Ser. No. 436,604, May 8, 1995, abandoned, which is a continuation of Ser. No. 304,636, Aug. 30, 1994, abandoned, which is a continuation of Ser. No. 50,114, Aug. 16, 1993, abandoned.

[30] Foreign Application Priority Data

Oct. 15, 1991 [DE] Germany ............... 41 34 111.2
Oct. 14, 1992 [WO] WIPO ............... PCT/EP92/02358

[51] Int. Cl.$^6$ .................................................. B32B 27/08
[52] U.S. Cl. ................. 428/516; 428/517; 428/519; 428/520; 525/240
[58] Field of Search .................. 525/240; 428/516, 428/517, 519, 520

[56] References Cited

U.S. PATENT DOCUMENTS 4,917,944  4/1990  Breitscheidel et al. ............... 428/516

*Primary Examiner*—Cecilia J. Tsang
*Assistant Examiner*—Patrick R. Delaney
*Attorney, Agent, or Firm*—Margaret B. Kelley; Rogers & Wells

[57] ABSTRACT

Described is a weather-resistant, plasticizer-free, deep-drawable film based on a semicrystalline ethylene/propylene/diene terpolymer and a homo- and/or copolymer of an alkene plus stabilizers and optional fillers, lubricants, pigments, and other ordinary additives. This film is characterized by the fact that the mixture of the semicrystalline ethylene/propylene/diene terpolymer and the homo- and/or copolymer of the alkene contains:

70–30 wt % semicrystalline ethylene/propylene/diene terpolymer (A) with approximately 56–76 wt % ethylene, approximately 15–30 wt % propylene, and approximately 9–14 wt % third component, while the terpolymer (A) has a melt-flow index MFI (230/2, 16) of approximately 5–15.0 g/10 min, and 70–30 wt % homo- and/or copolymer (B) of ethylene and/or propylene, while the homo- and/or copolymer has a melt-flow index MFI (230/2, 16) greater than 2.5 g/10 min. This film is especially suited for the interior covering and fittings of motor vehicles. It evidences good processibility while retaining the essential physical characteristics.

20 Claims, No Drawings

WEATHER-RESISTANT, PLASTICIZER-FREE, DEEP-DRAWABLE FILM

This is a division of application Ser. No. 08/436,604 filed on May 8, 1995, now abandoned, which is a continuation of application Ser. No. 08/304,636 filed Aug. 30, 1994, now abandoned, which is a continuation of application Ser. No. 08/050,114 filed Aug. 16, 1993, now abandoned.

The invention pertains to a weather-resistant, plasticizer-free, deep-drawable film based on semicrystalline ethylene/propylene/diene terpolymer, a homo- and/or copolymer of an alkene, and stabilizers plus optional fillers, lubricants, pigments, and other ordinary additives.

A film of the type described above is described in European Patent No. EP-A-0,203,399. This film is used for the interior covering and fittings of motor vehicles, e.g., for side coverings, crash pads, dashboards, headrests, for the canopy, or for the side coverings as corrosion protection in place of the usual soft PVC films. This enumeration of possible uses is not exhaustive. Inasmuch as the film according to EP-A-0,203,399 contains no plasticizers, it is not plagued with the disadvantage of their exudation. In the applicatory areas addressed, it shows good properties, e.g., high stress resistance, good breaking strength, high cold flexibility, good notched impact strength, and good heat and weather resistance. To this end, it is necessary that the aforesaid terpolymer have a melt-flow index MFI (230/5) of 0.5–2.0 g/10 min and that the aforesaid copolymer have a melt-flow index MFI (230/2, 16) no greater than 2 g/10 min. Accordingly, the melt-flow index must be kept low in order to achieve the desired characteristics. A low melt-flow index means more difficult processing, e.g., by calendering, extrusion, or casting.

Fundamental to the invention is the objective of improving the known film described above so that it is better manageable in the usual processing technique, such as calendering, extrusion, and casting, but still fulfills the characteristic demands essential for the trade.

In keeping with the invention, this objective is realized in that the mixture of the semicrystalline ethylene/propylene/diene terpolymer and the homo- and/or copolymer of an alkene contains:

70–30 wt % semicrystalline ethylene/propylene/diene terpolymer (A) with approximately 56–76 wt % ethylene, approximately 15–30 wt % propylene, and approximately 9–14 wt % third component, while the terpolymer (A) has a melt-flow index MFI (230/2, 16) of approximately 5–15.0 g/10 min, and 70–30 wt % homo- and/or copolymer (B) of ethylene and/or propylene, while the homo- and/or copolymer has a melt-flow index MFI (230/2, 16) greater than 2.5 g/10 min.

Accordingly, the film of the invention contains a synthetic material of the components (A) and (B), which, in respect to its starting monomers, shows parallels to EP-A-0,203,399. However, the polymerization of the starting materials of component (A) and component (B) is controlled in such a way that the required melt-flow index MFI of the invention is reached. Here the polymerization is specifically controlled so that uncrosslinked products are formed. Basically, however, it is also possible to achieve the desired effects with partial crosslinking. The crosslinkage must not progress so far that the requirements of the melt-flow index MFI (230/2, 16) are not fulfilled. A further control possibility for adjusting the desired melt-flow index consists of using an especially appropriate third component. The melt-flow index MFI (230/2, 16) of component (A) is at least approximately 5 and no greater than 15 g/10 min, preferably approximately 8–12 g/10 min. Especially suitable as the third component in component (A) are dicyclopentadiene and ethylidene-norbornene. In addition to the melt-flow index MFI of component (A), the melt-flow index MFI of component (B) is important for the desired effects of the invention. The latter is at least 2.5 g/10 min. It is advantageous that a maximal value of approximately 8 g/10 min not be exceeded. Ideally, component (B) is adjusted by way of suitably controlled polymerization, or by the selection of the quantitative ethylene/propylene ratio in the case of the copolymer, so that a melt-flow index MFI (230/2, 16) of approximately 2.5–6 g/10 min results in calendering and/or no greater than 12 g/10 min in extrusion. The method for determining the melt-flow index MFI is described in DIN No. 53,735.

In the case of a preferred film in keeping with the invention, the mixture of components (A) and (B) consists of approximately 52–29 wt % ethylene/propylene/diene terpolymer and approximately 48–71 wt % ethylene/propylene copolymer. Within the framework of the invention, an ethylene/propylene copolymer is particularly suitable as component (B). It preferably contains approximately 5–20 wt % ethylene. Therewith, especially good results are attained with a narrow molecular weight distribution, e.g., with a molecular weight distribution ($M_w/M_n$) less than about 10, particularly less than about 7. Ethylene copolymers have proven to be especially suitable additional copolymers, such as, an ethylene copolymer with some 5–20 wt % octene as the comonomer.

Known additives can be incorporated in the film of the invention, such as stabilizers, fillers, lubricants, pigments, and the like. In general, it is advantageous that the film contain stabilizers. These can be processing stabilizers, such as thermal stabilizers and antioxidants, but also stabilizers which ensure high durability and functional excellence. In particular, sterically hindered phenolic antioxidants, phenolic phosphites, thioesters of carboxylic acids, epoxy derivatives, and the like are employed to this end. Preferably, approximately 0.1–2.0 parts by weight, especially approximately 1.1–1.8 parts by weight, stabilizer are added to 100 parts by weight of the plastic mixture of components (A) and (B). For the purposes of the invention it is not necessary, unlike the requirements of EP-A-0,203, 399, that lubricants be included. Their incorporation is advantageous in individual cases. Suitable lubricants are metal salts of carboxylic acids, esters of montanic acid, and hydrogenated hydrocarbon resins. The preferred quantity of lubricant is approximately 0.1–2.5 parts by weight per 100 parts plastic mixture. For coloring, arbitrary pigments can be used, such as white pigments, especially titanium dioxide, but also blackening pigments, such as carbon black. The favorable quantity of pigment is approximately 1–10 parts by weight per 100 parts by weight plastic mixture. When carbon black is used as a filler, it contributes to enhanced weather resistance. Furthermore, strengthening fillers can be used, among which semiactive and active carbon blacks and their mixtures, as well as potassium-aluminum silicate and talc, can be counted. The fillers are preferably finely particulate.

For the advantages associated with the film of the present invention, the nature of the production process is decisive. For instance, the end materials can be processed by calendering, extrusion, or casting. Calendering is an especially economical process. It is also possible to produce a thicker film with thinner films meeting the requirement profile of the invention, which can be accomplished by laminating or duplexing calendered, extruded, and/or thinner films.

It is advantageous that the film of the invention have a thickness of 0.2–0.8 mm. This range can be more or less greatly exceeded. Nevertheless, no relevant advantages are realized with a thickness greater than approximately 3 mm. Up to a thickness of approximately 3 mm, the technical effects desirable in application are already attained. Greater thickness would mean only unnecessary added costs.

The film of the invention shows, in the end result, the advantages ascribed to the film described in EP-A-0,203,399, albeit with the aforesaid surprising advantage of better workability in the cited processing techniques, such as calendering and the like. It is particularly outstanding in respect to the following characteristics: deep drawability, resistance to cold, elongation, resistance to heat, light, and weather, special suitability for embossing dull surfaces, temperature stability of parts molded from the film, i.e., deformation resistance, no white breaking of the film during molding, e.g., in the deep-drawing process and vacuum molding. At the same time, the film of the invention can be used for all applicatory purposes already described in connection with EP-A-0,203,399, especially for the production of molded parts, such as side panels, interior door panels, armrests, tunnel covers, dashboards, canopies, complete or in part, or crash pads. Backing with polyurethane foam, combining with other films or flat textile items directly in the outer area, or use as protective covering is entirely feasible.

The invention is explained below by way of various examples.

EXAMPLES

Films in keeping with the invention were produced from the following formulations:

| Example | 1 (wt %) | 2 (wt %) | 3 (wt %) | 4 (wt %) | 5 (wt %) |
|---|---|---|---|---|---|
| Ethylene/propylene/ dicyclopentadiene terpolymer (component A) | 29 | 52 | 52 | 44 | 44 |
| Polypropylene copolymer (component $B_1$) | 25 | 9 | 25 | 21 | — |
| Polyethylene copolymer (component $B_2$) | 29 | 25 | 9 | 21 | 44 |
| Potassium aluminum silicate (filler) | 17 | 14 | 14 | 14 | 12 |
| Carbon black (filler) | — | 1 | 0.8 | 2.5 | 2.5 |
| Calcium stearate (lubricant) | 0.5 | 0.5 | 0.5 | 0.5 | 0.5 |
| Pentaerythritol 3,5-di- tert-butyl-4-hydroxy- phenyl propionate (stabilizer) | 0.5 | 0.5 | 0.5 | 0.5 | 0.5 |

Remark:

Component A: 70 t % ethylene, 16 wt % propylene, and 14 wt % dicyclopentadiene.

Component $B_1$: 92 wt % propylene and 8 wt % ethylene.

Component $B_2$: 94 wt % ethylene and 6 wt % 1-octene.

The various starting materials or starting mixtures described above for the different examples were plasticized and homogenized in a double-screw extruder at a temperature of approximately 210° C. and then introduced into a calender to form a film. The obtained films in a thickness of about 1 mm had the following characteristics:

| Example | 1 | 2 | 3 | 4 | 5 |
|---|---|---|---|---|---|
| Hardness (Shore D/15 s) according to DIN 53,505 | 47 | 40 | 40 | 45 | 35 |
| Initial elongation at tear according to DIN 53,455 | 511 | 518 | 520 | 590 | 644 |
| Residual elongation at tear with storage for 500 h at 120° C. according to DIN 53,455 | 450 | 460 | 465 | 550 | 625 |
| Residual elongation at tear after UV irradiation of 600 h (commensurate with DIN 75,220), measured according to DIN 53,455 | 415 | 420 | 430 | 460 | 580 |

What is claimed is:

1. A method for improving the processability of a film-forming mixture used for producing a weather-resistant, plasticizer-free, deep-drawable film by providing a mixture which consists essentially of (a) 30–70 wt. % of a semi-crystalline ethylene/propylene/diene terpolymer containing about 56–76 wt. % ethylene, about 15–30 wt. % propylene, and about 9–14 wt. % of a diene and having a melt flow index MFI (230/2.16) of about 5–15 g./10 min. and (b) 70–30 wt. % of an ethylene or propylene copolymer having a melt flow index MFI (230/2.16) of greater than 2.5 g./10 min, plasticizing and homogenizing the mixture at an elevated temperature, and molding the plasticized mixture into a film by extruding, calenderizing, or casting.

2. A method for improving the processability of a film-forming mixture used for producing a weather-resistant, plasticizer-free, deep-drawable film by providing a mixture which consists essentially of (a) 30–70 wt. % of a semi-crystalline ethylene/propylene/diene terpolymer containing about 56–76 wt. % ethylene, about 15–30 wt. % propylene, and about 9–14 wt. % of a diene and having a melt flow index MFI (230/2.16) of about 5–15 g./10 min. and (b) 70–30 wt. % of an ethylene or propylene copolymer having a melt flow index MFI (230/2.16) of greater than 2.5 g./10 min, plasticizing and homogenizing the mixture at an elevated temperature, and molding the plasticized mixture into a film by extruding, calenderizing, or casting, wherein during the steps of plasticizing, homogenizing, and molding essentially no lubricant is present.

3. The method of claim 1, wherein the terpolymer is 29–52 wt. % and the copolymer is 71–48 wt. %.

4. The method of claim 1, wherein the terpolymer contains at least about 65 wt. % ethylene.

5. The method of claim 1, wherein the diene in the terpolymer is dicyclopentadiene, ethylidene norbornene, or mixtures thereof.

6. The method of claim 1, wherein the melt-flow index of the terpolymer is between 8 and 12 g./10 min.

7. The method of claim 1, wherein the copolymer contains about 5–20 wt. % ethylene.

8. The method of claim 1, wherein the copolymer is an ethylene copolymer with about 5–20 wt. % octene.

9. The method of claim 1, wherein the copolymer is a propylene copolymer with about 8 wt. % ethylene.

10. The method of claim 1, wherein the melt-flow index of the copolymer is between 2.5 and 8 g./10 min.

11. The method of claim 1, wherein the copolymer has a narrow molecular weight distribution ($M_w/M_N$) of about <10.

12. The method of claim 11, wherein the molecular weight distribution is <7.

13. The method of claim 1, wherein the diene in the terpolymer is dicyclopentadiene, ethylidene norbornene, or mixtures thereof; wherein the melt-flow index of the terpolymer is between 8 and 12 g./10 min.; wherein the copolymer is 92 wt. % propylene and 8 wt. % ethylene or 94 wt % ethylene and 6 wt. % 1-octene; and wherein the melt-flow index of the copolymer is between 2.5 and 8 g./10 min.

14. The method of claim 1, wherein the mixture further consists essentially of a filler.

15. The method of claim 14, wherein the amount of the filler is about 12–30 parts by weight per 100 parts of the mixture of the terpolymer and the copolymer.

16. The method of claim 15, wherein the filler is potassium, aluminum, silicate, talc, chalk, kaolin, carbon black, or mixtures thereof.

17. The method of claim 14, wherein the mixture further consists essentially of stabilizers, lubricants and/or dyes.

18. The method of claim 1, wherein the film is produced by calendering and wherein the copolymer has a melt-flow index between greater than 2.5 and about 6 g./10 min.

19. The method of claim 1, wherein the film is produced by extruding and wherein the copolymer has a melt-flow index of no more than 12 g./10 min.

20. The method of claim 1, wherein the film is used as an internal or an external lining of a motor vehicle.

* * * * *